US008947748B2

(12) United States Patent
Kubo et al.

(10) Patent No.: US 8,947,748 B2
(45) Date of Patent: Feb. 3, 2015

(54) SCANNING DEVICE, APPARATUS AND METHOD FOR IMAGE PROCESSING

(71) Applicant: PFU Limited, Ishikawa (JP)

(72) Inventors: Satoshi Kubo, Ishikawa (JP); Yusuke Nakashima, Ishikawa (JP); Yasuhiko Kitagawa, Ishikawa (JP)

(73) Assignee: PFU Limited, Ishikawa (JP)

( * ) Notice: Subject to any disclaimer, the term of this patent is extended or adjusted under 35 U.S.C. 154(b) by 0 days.

(21) Appl. No.: 13/914,076

(22) Filed: Jun. 10, 2013

(65) Prior Publication Data
US 2013/0265621 A1 Oct. 10, 2013

Related U.S. Application Data

(63) Continuation of application No. 12/025,574, filed on Feb. 4, 2008, now Pat. No. 8,531,737.

(30) Foreign Application Priority Data

Mar. 14, 2007 (JP) .................................. 2007-065091

(51) Int. Cl.
*H04N 1/04* (2006.01)
*H04N 1/40* (2006.01)
(Continued)

(52) U.S. Cl.
CPC ............. *H04N 1/46* (2013.01); *H04N 1/00525* (2013.01); *H04N 1/203* (2013.01); *H04N 1/2032* (2013.01); *H04N 1/12* (2013.01); *H04N 1/193* (2013.01); *H04N 2201/0081* (2013.01)
USPC ........... 358/474; 358/483; 358/482; 358/496; 358/475; 358/408; 358/444

(58) Field of Classification Search
USPC ......... 358/496, 498, 408, 461, 474, 475, 509, 358/483, 482, 473, 444; 399/364, 211, 212; 355/23, 24; 382/313, 318, 319, 274
See application file for complete search history.

(56) References Cited

U.S. PATENT DOCUMENTS

| 4,743,974 A | 5/1988 | Lockwood |
|---|---|---|
| 5,280,368 A | 1/1994 | Fullerton |

(Continued)

FOREIGN PATENT DOCUMENTS

| CN | 1469299 | | 1/2004 |
|---|---|---|---|
| CN | 1705338 | A | 12/2005 |

(Continued)

OTHER PUBLICATIONS

Japanese Office Action for Application No. 2007-065091 mailed Aug. 30, 2011.

(Continued)

*Primary Examiner* — Cheukfan Lee
(74) *Attorney, Agent, or Firm* — Lowe Hauptman & Ham, LLP

(57) ABSTRACT

A scanning device includes a first scanning unit having a first line sensor and a first light source that emits a first light beam and is arranged only at one side of the first scanning unit in a main scanning direction, and a second scanning unit having a second line sensor and a second light source that emits a second light beam and is arranged only at one side of the second scanning unit in the main scanning direction. The first scanning unit and the second scanning unit face each other and are disposed such that the first light source and the second light source are arranged at the same side of the main scanning direction, and centers of the first line sensor and the second line sensor are located at the same position in the main scanning direction.

14 Claims, 8 Drawing Sheets

(51) Int. Cl.
*H04N 1/46* (2006.01)
*H04N 1/00* (2006.01)
*H04N 1/203* (2006.01)
H04N 1/12 (2006.01)
H04N 1/193 (2006.01)

(56) References Cited

U.S. PATENT DOCUMENTS

| | | |
|---|---|---|
| 5,298,937 A | 3/1994 | Telle |
| 5,452,108 A | 9/1995 | Muramatsu |
| 5,499,112 A | 3/1996 | Kawai et al. |
| 5,646,744 A | 7/1997 | Knox |
| 5,689,347 A | 11/1997 | Naoi |
| 5,826,133 A | 10/1998 | Saito et al. |
| 6,323,933 B1 * | 11/2001 | Anzai .............................. 355/23 |
| 6,556,317 B2 | 4/2003 | Tabata et al. |
| 7,136,203 B2 | 11/2006 | Yokota et al. |
| 7,411,704 B2 | 8/2008 | Wang |
| 7,466,457 B2 | 12/2008 | Chen |
| 7,522,321 B2 | 4/2009 | Chen |
| 7,646,514 B2 | 1/2010 | Spears et al. |
| 7,751,099 B2 | 7/2010 | Mizuhashi et al. |
| 8,531,737 B2 * | 9/2013 | Kubo et al. .................... 358/474 |
| 2004/0165233 A1 | 8/2004 | Wang |
| 2006/0056789 A1 | 3/2006 | Saito et al. |
| 2007/0165285 A1 | 7/2007 | Inada |
| 2008/0259414 A1 | 10/2008 | Kitagawa et al. |
| 2011/0096371 A1 | 4/2011 | Mui et al. |

FOREIGN PATENT DOCUMENTS

| | | |
|---|---|---|
| CN | 1722768 | 1/2006 |
| CN | 1750585 A | 3/2006 |
| JP | 11284798 | 10/1999 |
| JP | 11284798 A * | 10/1999 |
| JP | 2005191795 | 7/2005 |
| JP | 2006-140902 A | 6/2006 |

OTHER PUBLICATIONS

Chinese Office Action for Application No. 200810082957.X dated Mar. 9, 2010.

Office Action for U.S. Appl. No. 13/914,169 dated Oct. 1, 2013.

Office Action issued May 7, 2014, corresponds to Chinese patent application No. 201210317298.X.

* cited by examiner

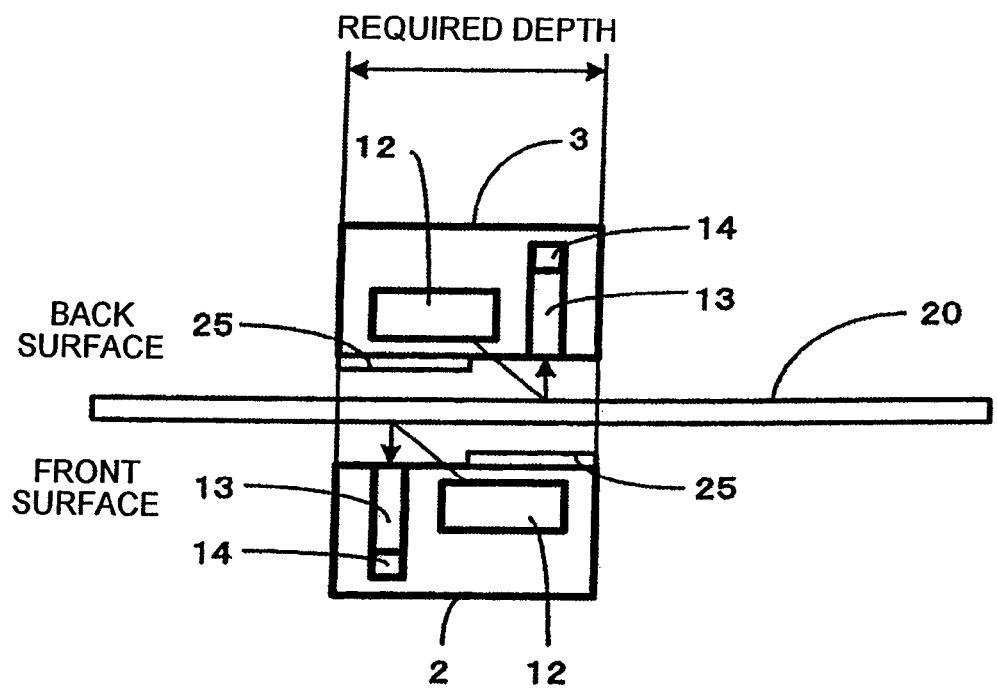

FIG.7A -CONVENTIONAL ART-
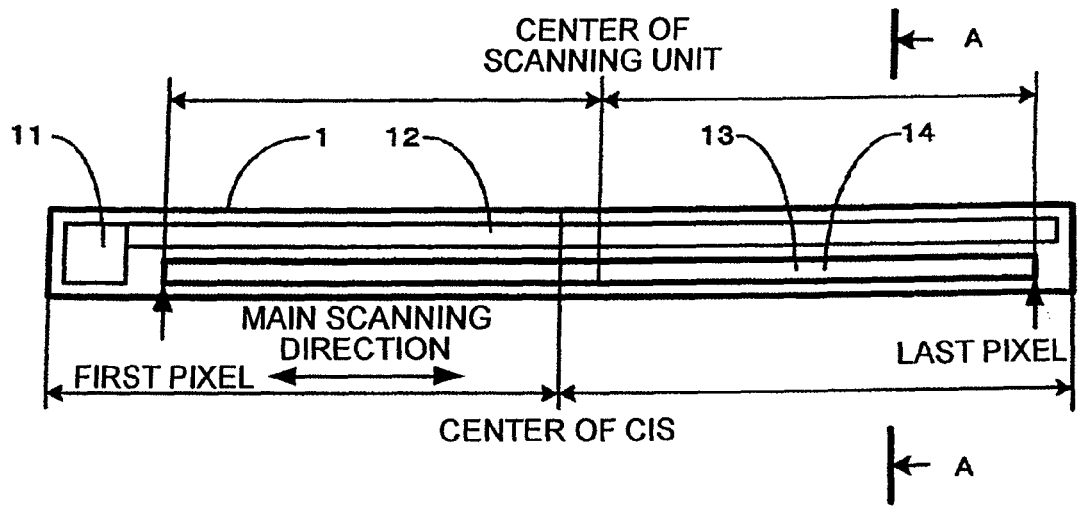
FIG.7B -CONVENTIONAL ART-
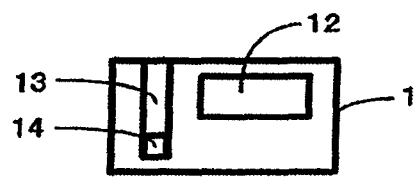
FIG.7C -CONVENTIONAL ART-
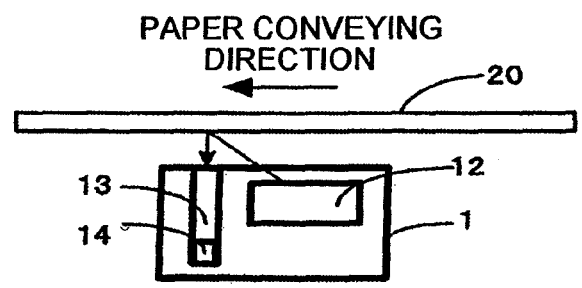

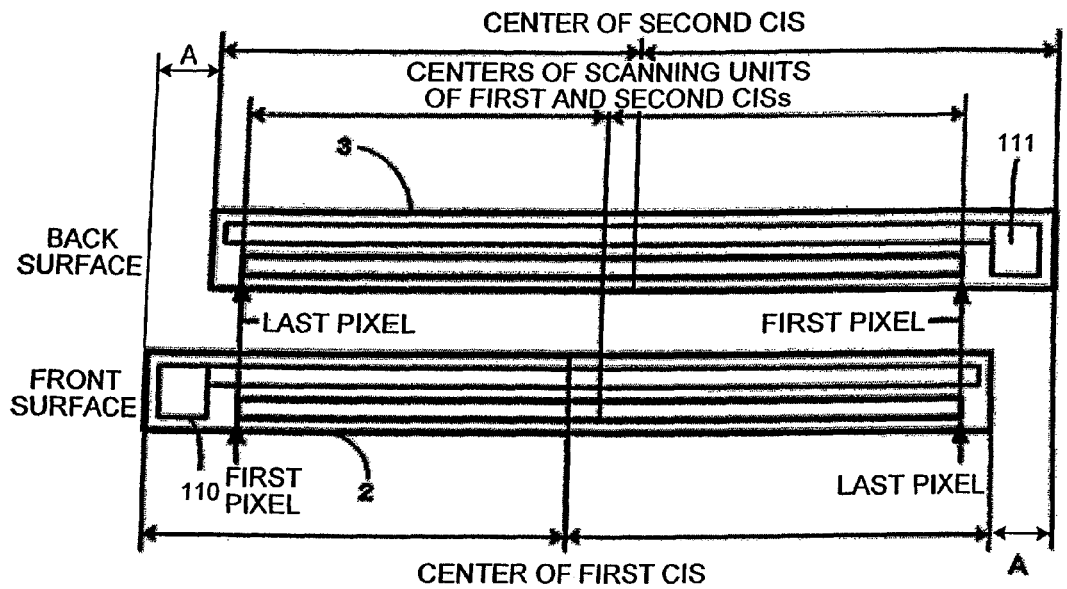
FIG.8A -CONVENTIONAL ART-
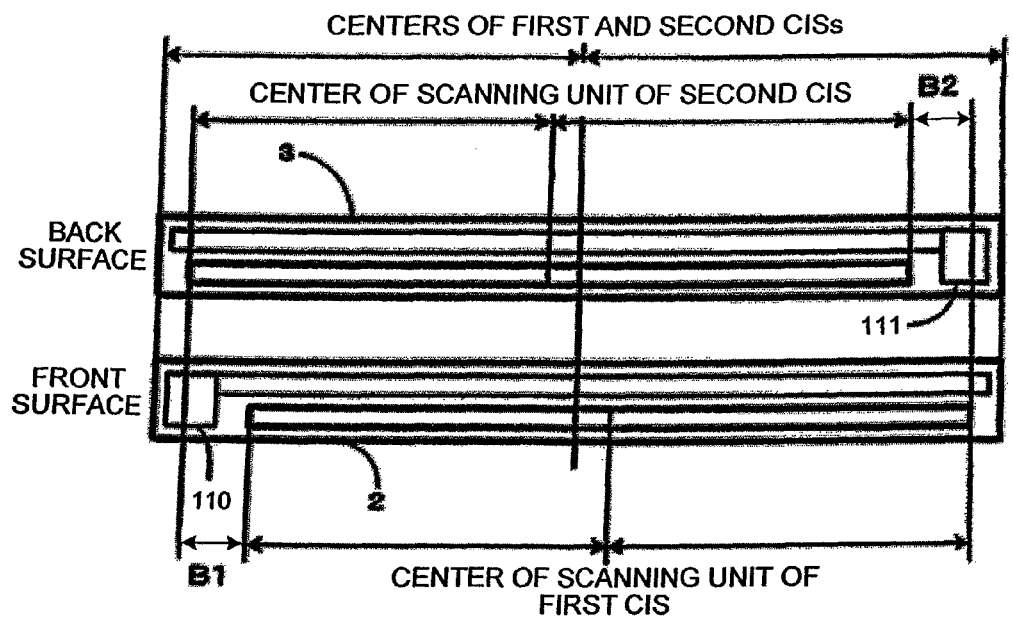
FIG.8B -CONVENTIONAL ART-

FIG.9A -CONVENTIONAL ART-
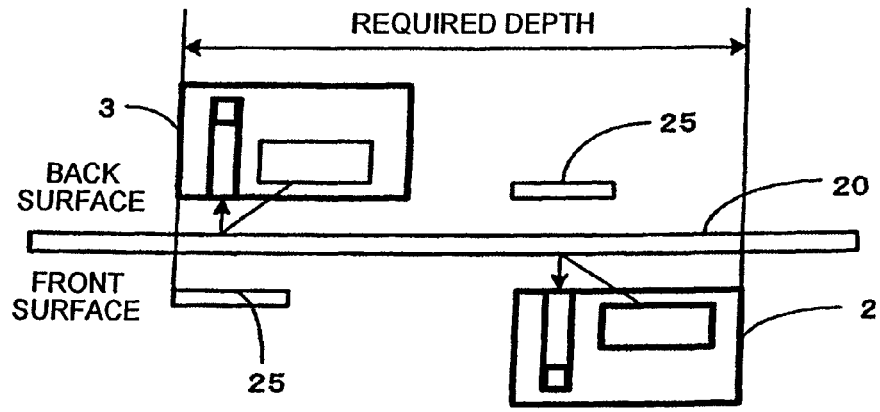
FIG.9B -CONVENTIONAL ART-
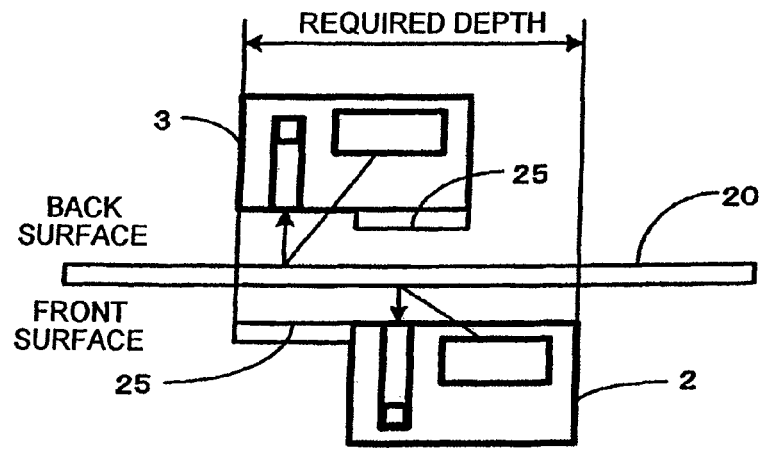
FIG.9C -CONVENTIONAL ART-
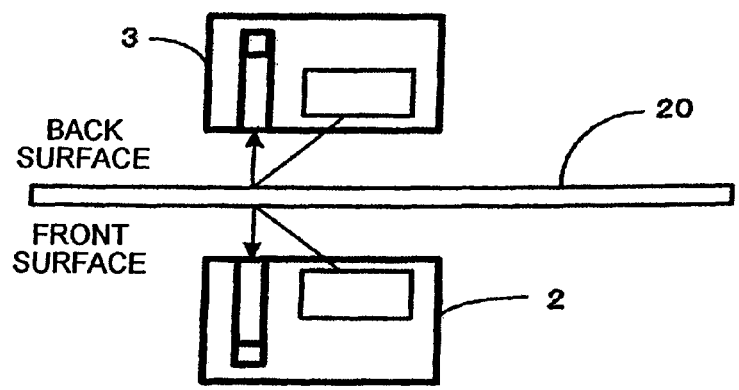

SCANNING DEVICE, APPARATUS AND METHOD FOR IMAGE PROCESSING

RELATED APPLICATIONS

The present application is a continuation of application Ser. No. 12/025,574, filed Feb. 4, 2008, which claims priority from Japanese Application No. 2007-065091, filed Mar. 14, 2007, the disclosure of which is hereby incorporated by reference herein in its entirety.

BACKGROUND OF THE INVENTION

1. Field of the Invention

The present invention relates to a technology for scanning the front and the back surfaces of a paper.

2. Description of the Related Art

Various approaches have been taken to reduce the size of a scanning device. For example, use of a contact image sensor (CIS), use a CIS having fewer light emitting diodes (LEDs), etc. helps to reduce the size of a scanning device.

FIG. 7A is a schematic diagram of a conventional CIS 1. FIG. 7B is a side view of the conventional CIS 1 taken along a line A-A shown in FIG. 7A. FIG. 7C is a schematic diagram for explaining scanning operation performed by the conventional CIS 1.

The CIS 1 includes a light source 11 arranged at a first end in a main scanning direction. Although not shown, the light source 11 includes three-color LEDs, i.e., a red LED that emits a red light beam, a green LED that emits a green light beam, and a blue LED that emits a blue light beam. When the CIS 1 scans a surface of a printed paper 20 by each line, each of the three LEDs emits a light beam of corresponding color in the time division manner. The light beam then passes through a light guide plate 12, so that the light beam is uniformly projected onto the printed paper 20. The printed paper 20 reflects the light beam. A rod lens array 13 collects the reflected light beam, and converges the reflected light beam onto the line sensor 14 by each pixel. A photoelectric conversion element (not shown) included in the line sensor 14 converts the received light beam into an electric signal.

As shown in FIG. 7A, because the light source 11 is arranged at the first end, the center of the CIS 1 and the center of a scanning unit (the line sensor 14) are located in different positions in the main scanning direction.

The CIS 1 scans a surface of the printed paper 20 by each line in the main scanning direction, i.e., the CIS 1 scans each line from the first pixel arranged at the first end, to the last pixel arranged at a second end opposite to the first end. As shown in FIG. 7C, when the CIS 1 finishes scanning one line, the printed paper 20 is moved over the CIS 1 in a direction perpendicular to the main scanning direction, i.e., a sub-scanning direction, for a distance equivalent to one line. The CIS 1 then scans the next line on the surface of the printed paper 20.

Japanese Patent Application Laid-open No. 2006-140902 discloses a conventional scanning device including two CISs that concurrently scan the front and the back surfaces of a printed paper. Specifically, as shown in FIGS. 8A to 9C, a first CIS 2 and a second CIS 3 are arranged in such a manner that the first CIS 2 faces the front surface of the printed paper 20 and the second CIS 3 faces the back surface of the printed paper 20. The printed paper 20 is supplied from a paper feed tray (not shown), and the printed paper is conveyed between the first CIS 2 and the second CIS 3. Then, the first CIS 2 and the second CIS 3 concurrently scan the front and the back surfaces of the printed paper 20.

FIG. 8A is a schematic diagram for explaining an arrangement of the first CIS 2 and the second CIS 3. The first CIS 2 is arranged to face the front surface, and the second CIS 3 is arranged to face the back surface of the printed paper 20. The first CIS 2 scans the front surface thereby obtaining an image of the front surface, and the second CIS 3 scans the back surface thereby obtaining an image of the back surface. The first CIS 2 scans the front surface in a forward direction, which is a direction from left to right, with respect to the front surface. The second CIS 3 scans the back surface in the forward direction, which is a direction from left to right, with respect to the back surface. In other words, scanning directions of the first CIS 2 and the second CIS 3 are opposite. Therefore, a light source 110 of the first CIS 2 and a light source 111 of the second CIS 3 are arranged at the opposite ends in the main scanning direction.

Because the light sources 110 and 111 are arranged at the opposite ends in the main scanning direction, undesired spaces indicated by two-headed arrows A are formed in the main scanning direction. As a result, the width of the scanning device increases.

As shown in FIG. 8B, the first CIS 2 and the second CIS 3 can be arranged in such a manner that the centers of the first CIS 2 and the second CIS 3 are located in the same position so that an undesired space is not formed in the main scanning direction. In this arrangement, however, the first CIS 2 cannot scan a part of the front surface of the printed paper indicated by a two-headed arrow B1, and the second CIS 3 cannot scan a part of the back surface of the printed paper indicated by a two-headed arrow B2.

FIGS. 9A to 9C are schematic diagrams for explaining the depth required for arranging the first CIS 2 and the second CIS 3. The depth is the distance in the sub-scanning direction. As shown in FIG. 9A, each of the first CIS 2 and the second CIS 3 is generally provided with a white reference portion 25 that generates white reference data to be used for shading correction performed by the scanning device. As shown in FIG. 9B, the first CIS 2 and the second CIS 3 can be arranged close to each other, thereby reducing the depth required for arrangement of the first CIS 2 and the second CIS 3. However, the white reference portions 25 are required to be arranged in such a manner that the white reference portion 25 of the first CIS 2 is not affected by a light beam emitted from the light source 11 of the second CIS 3, and the white reference portion 25 of the second CIS 3 is not affected by a light beam emitted from the light source 11 of the first CIS 2.

As shown in FIG. 9C, the first CIS 2 and the second CIS 3 can be arranged such that they are almost above/below each other. With this arrangement, the depth required for the first CIS 2 and the second CIS 3 can be reduced to the minimum, however, there is no space for arranging the white reference portions 25. Therefore, calibration data used for shading correction is stored in a memory (not shown) of the scanning device, which causes increase of costs. In addition, the calibration operation must be performed manually such that a sheet of paper is scanned and the image data is processed, which causes inconvenience to a user.

In this manner, in the scanning device shown in FIGS. 8A to 9C, undesired spaces are formed in the sub-scanning direction, and the width of the scanning device increases. Moreover, either spaces are required for arranging the white reference portions, or a memory is required for storing calibration data.

In recent years, improvements have been made in a portable computer and a portable scanning device. A user can carry a scanning device together with a portable computer, such as a laptop computer or a mobile computer. Therefore, there is a need of improving a technology for reducing the size of a scanning device.

SUMMARY OF THE INVENTION

It is an object of the present invention to at least partially solve the problems in the conventional technology.

According to an aspect of the present invention, there is provided a scanning device including a first scanning unit that scans a first surface of a scan-target medium along a scanning direction to obtain a first image; a second scanning unit that scans a second surface of the scan-target medium along the scanning direction to obtain a second image; and at least one light source that emits a light beam on the first surface while the first scanning unit is scanning the first surface and emits a light beam on the second surface while the second scanning unit is scanning the second surface, wherein the light source is arranged at one side of the scanning direction.

According to another aspect of the present invention, there is provided an image processing method including acquiring a first image of a first surface of a scan-target medium and a second image of a second surface of the scan-target medium by using a scanning device including a first scanning unit that scans a first surface of a scan-target medium along a scanning direction to obtain a first image; a second scanning unit that scans a second surface of the scan-target medium along the scanning direction to obtain a second image; and at least one light source that emits a light beam on the first surface while the first scanning unit is scanning the first surface and emits a light beam on the second surface while the second scanning unit is scanning the second surface, wherein the light source is arranged at one side of the scanning direction; and processing and outputting the first image and the second image.

According to still another aspect of the present invention, there is provided an image processing apparatus including a scanning device including a first scanning unit that scans a first surface of a scan-target medium along a scanning direction to obtain a first image; a second scanning unit that scans a second surface of the scan-target medium along the scanning direction to obtain a second image; and at least one light source that emits a light beam on the first surface while the first scanning unit is scanning the first surface and emits a light beam on the second surface while the second scanning unit is scanning the second surface, wherein the light source is arranged at one side of the scanning direction; a supplying unit that supplies the scan-target medium to the scanning device; a discharge unit that discharges the scan-target medium from the scanning device; and an information processing device that processes and outputs the first image and the second image.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a schematic diagram for explaining the depth required for arranging the first CIS and the second CIS;

FIGS. 7A to 7c are schematic diagrams for explaining a conventional scanning device;

FIGS. 8A and 8B and FIGS. 9A to 9C are schematic diagrams for explaining another conventional scanning device.

DETAILED DESCRIPTION OF THE PREFERRED EMBODIMENTS

Figure 1:
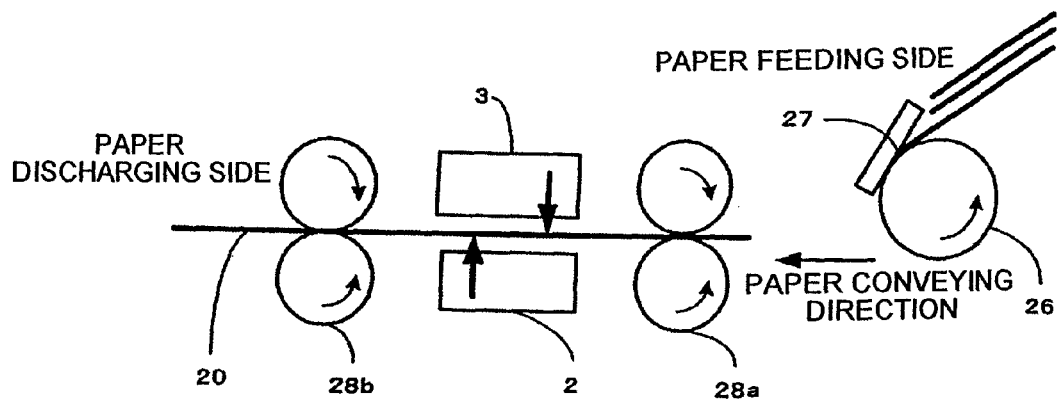
FIG. 1 is a schematic diagram of a scanning device according to an embodiment of the present invention.

Exemplary embodiments of the present invention are explained in detail below with reference to the accompanying drawings.

The same reference numerals are used for components that have the same function as those in the above conventional scanning device, and detailed descriptions of such components are omitted.

FIG. 1 is a schematic diagram of a scanning device according to an embodiment of the present invention. The first CIS 2 is arranged to face the front surface of the printed paper 20, and the second CIS 3 is arranged to face the back surface of the printed paper 20. The first CIS 2 and the second CIS 3 concurrently scan the front and the back surfaces thereby obtaining images of the printed paper 20. The first CIS 2 scans the front surface in the forward direction with respect to the front surface, and the second CIS 3 scans the back surface in a backward direction, which is a direction opposite to the forward direction, with respect to the back surface. In other words, the scanning directions of the first CIS 2 and the second CIS 3 are the same.

The scanning device includes an auto document feeder (ADF). The ADF is operated as described below. A pile of the printed papers 20 is stacked on a hopper (not shown). Each of the printed papers 20 is pulled out from the bottom of the pile by a pick roller 26 and a separation pad 27, and the pulled-out printed paper 20 is fed to a pair of conveying rollers 28a one by one. The hopper can be retractable. If the hopper is retractable, the hopper is retracted inside the scanning device when the scanning device is not in use or the scanning device is carried by a user.

The conveying rollers 28a and a pair of conveying rollers 28b convey the printed paper 20 between the first CIS 2 and the second CIS 3. When the first CIS 2 and the second CIS 3 finish scanning one line on a surface of the printed paper 20, the conveying rollers 28a and 28b move the printed paper 20 in the sub-scanning direction for a distance equivalent to one line. The sub-scanning direction is a direction perpendicular to the main scanning direction. Each of the first CIS 2 and the second CIS 3 then scans the next line on the surface of the printed paper 20. When each of the first CIS 2 and the second CIS 3 finishes scanning the front and the back surfaces of the printed paper 20, the conveying rollers 28b discharge the printed paper 20 out of the scanning device.

The first CIS 2 includes a light source 21 and the second CIS 3 includes a light source 31. The light sources 21 and 31 are arranged at the same end in the main scanning direction. The first CIS 2 and the second CIS 3 can have different outer shapes and dimensions under conditions the main scanning directions of the first CIS 2 and the second CIS 3 are the same.

Figure 2:
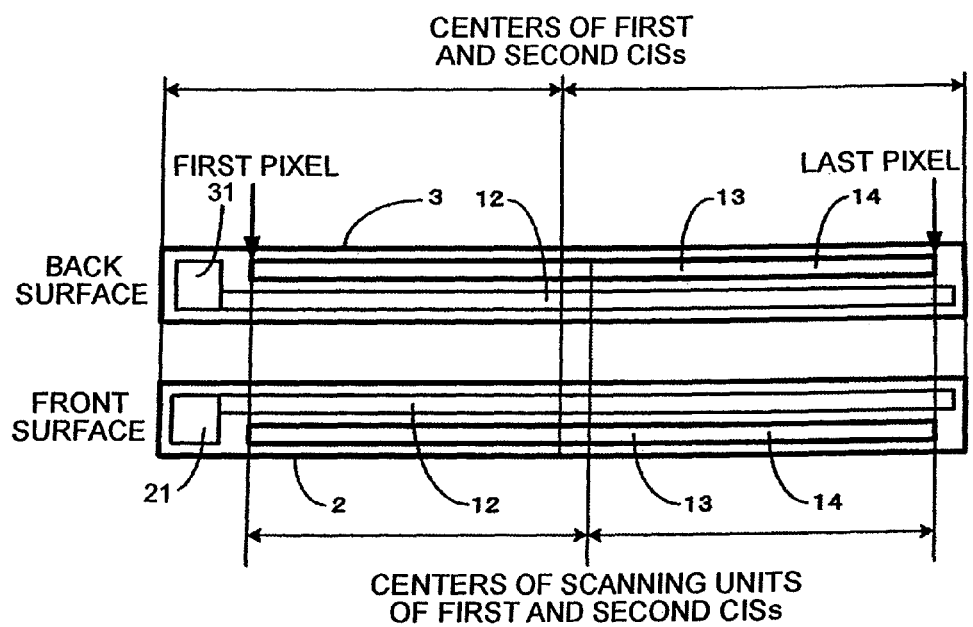
FIG. 2 is a schematic diagram for explaining an arrangement of a first CIS and a second CIS of the scanning device.
Figure 3A:
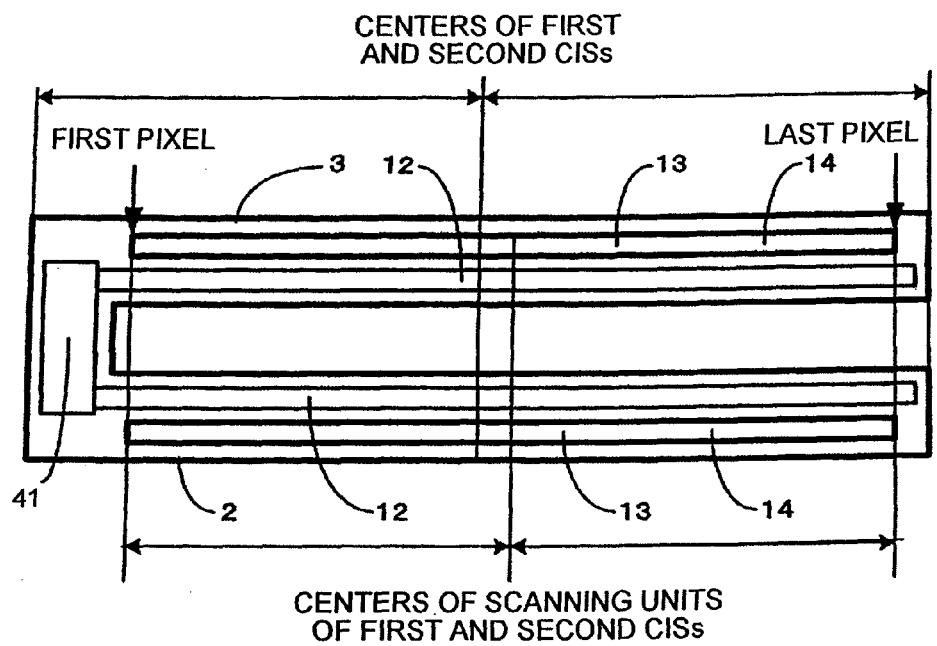
FIGS. 3A and 3B are schematic diagrams of other examples of arrangement of the first CIS and the second CIS.
Figure 3B:
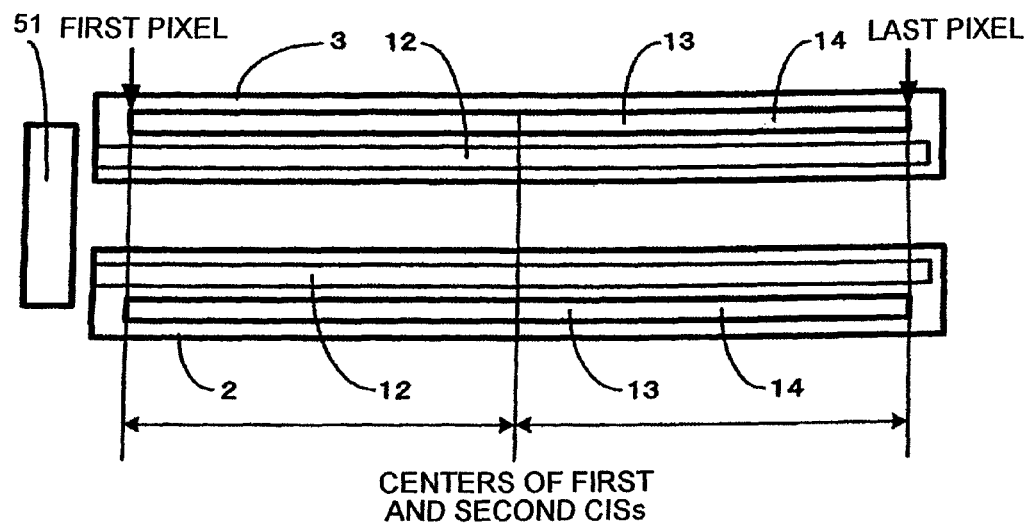

FIG. 2 is a schematic diagram of arrangement of the first CIS 2 and the second CIS 3. FIGS. 3A and 3B are schematic diagrams of other examples of arrangement of the first CIS 2 and the second CIS 3. The first CIS 2 is arranged to face the front surface, and the second CIS 3 is arranged to face the back surface of the printed paper 20.

As shown in FIG. 2, the centers of the first CIS 2 and the second CIS 3 are located at the same position in the main scanning direction. The centers of the scanning units (the line sensors 14) of the first CIS 2 and the second CIS 3 are located at the same position in the main scanning direction. With this configuration, the spaces indicated by the arrows A shown in FIG. 8A can be eliminated. As a result, the width of the scanning device can be reduced. Furthermore, the areas indicated by the arrows B1, B2 shown in FIG. 8B can be eliminated.

Although not shown, each of the light sources 21 and 31 includes three-color LEDs, i.e., a red LED that emits a red light beam, a green LED that emits a green light beam, and a blue LED that emits a blue light beam. When each of the first CIS 2 and the second CIS 3 scans a surface of the printed paper 20 by each line, each of the three LEDs emits the light beam to each line in the time division manner. The light beam then passes through the light guide plate 12, so that the light beam is uniformly projected onto the printed paper 20. The printed paper 20 reflects the light beam. The rod lens array 13 collects the reflected light beam, and converges the reflected light beam onto the line sensor 14 by each pixel. A photoelectric conversion element (not shown) included in the line sensor 14 converts the received light beam into an electric signal.

The second CIS 3 scans the back surface of the printed paper 20 in the backward direction with respect to a scanned surface of the printed paper 20, while the first CIS 2 scans the front surface of the printed paper 20 in the forward direction with respect to a scanned surface of the printed paper 20. As a result, an image acquired by the second CIS 3 is a mirrored image of the image printed on the printed paper 20. Therefore, an image acquired by the second CIS 3 needs to be inverted by 180 degrees.

Although a configuration is explained above in which the first CIS 2 scans the front surface of the printed paper 20 and the second CIS 3 scans the back surface, the present invention is not limited to this configuration. For example, a surface of the printed paper 20 to be scanned by each of the first CIS 2 and the second CIS 3 can be determined depending on a conveying direction of the printed paper 20, or whether the printed paper 20 is pulled out from the top or the bottom of a pile of the printed papers 20 when the printed paper 20 is supplied from a paper feeding side.

Although a configuration is explained above in which two light sources 21 and 31 are used, it is possible to use a common light source for the first CIS 2 and the second CIS 3. As shown in FIG. 3A, the first CIS 2, the second CIS 3, and a common light source 41 can be formed as one piece. On the contrary, as shown in FIG. 3B, the first CIS 2, the second CIS 3, and a common light source 51 can be formed as separate pieces. In both cases, the centers of the first CIS 2 and the second CIS 3 are located at the same position, and the centers of the scanning units (the line sensors 14) of the first CIS 2 and the second CIS 3 are located at the same position.

Although not shown, each of the light sources 21 and 31 includes three-color LEDs, i.e., a red LED that emits a red light beam, a green LED that emits a green light beam, and a blue LED that emits a blue light beam. When each of the first CIS 2 and the second CIS 3 scans a surface of the printed paper 20 by each line, each of the three LEDs emits the light beam to each line in the time division manner. The light beam then passes through the light guide plate 12, so that the light beam is uniformly projected onto the printed paper 20. The printed paper 20 reflects the light beam. A rod lens array 13 collects the reflected light beam, and converges the reflected light beam onto the line sensor 14 by each pixel. A photoelectric conversion element (not shown) included in the line sensor 14 converts the light beam into an electric signal.

FIG. 4 is a schematic diagram for explaining the depth required for arranging the first CIS 2 and the second CIS 3. Because the first CIS 2 and the second CIS 3 face to each other, the depth required for the first CIS 2 and the second CIS 3 is reduced to the minimum. The white reference portions 25 for the first CIS 2 and the second CIS 3 are arranged to a position closest to each other out of positions in which the white reference portion 25 of the first CIS 2 is not affected by a light beam emitted from the light source 11 of the second CIS 3, and the white reference portion 25 of the second CIS 3 is not affected by a light beam emitted from the light source 11 of the first CIS 2.

Figure 5A:
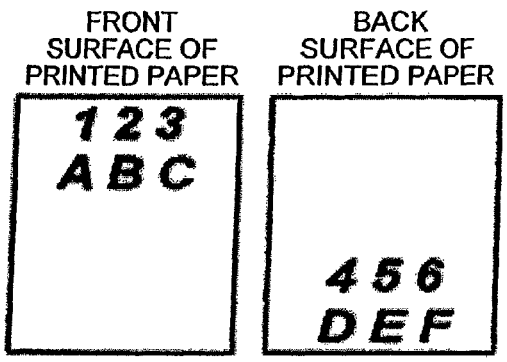
FIGS. 5A to 5E are schematic diagrams for explaining image processing performed by the scanning device.
Figure 5B:
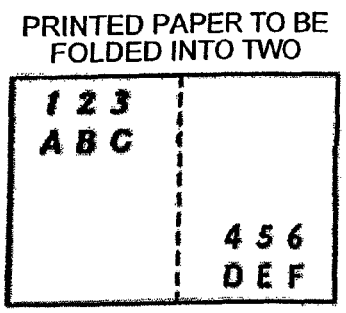

FIGS. 5A to 5E are schematic diagrams for explaining image processing performed by the scanning device. As shown in FIG. 5A, the scanning device concurrently scans the front and the back surfaces of the printed paper 20. Alternatively, as shown in FIG. 5B, the printed paper 20 is folded in two, and both surfaces of the folded printed paper 20 can be concurrently scanned by the scanning device.

Figure 5C:
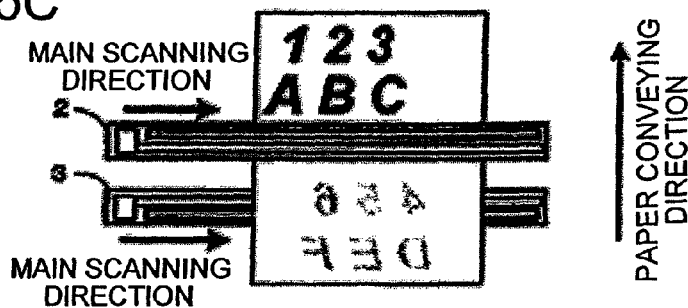

As shown in FIG. 5C, when each of the first CIS 2 and the second CIS 3 scans one line of the printed paper 20, each of the three LEDs emits the light beam to the line in the time division manner. In this manner, the first CIS 2 scans the front surface of the printed paper 20 and the second CIS 3 scans the back surface of the printed paper 20. Although the two CISs 2 and 3 are provided, it is possible to operate only one of the CISs 21 and 31 at a time.

Figure 5D:
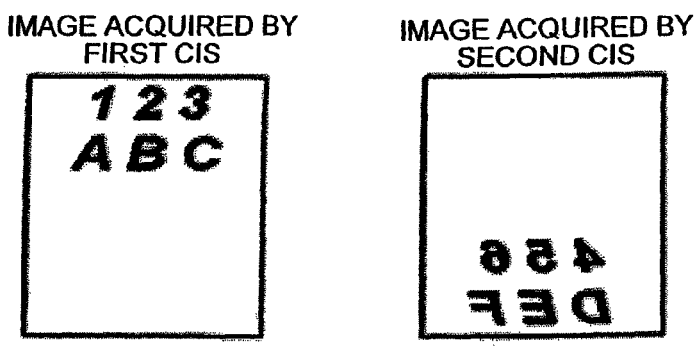
Figure 5E:
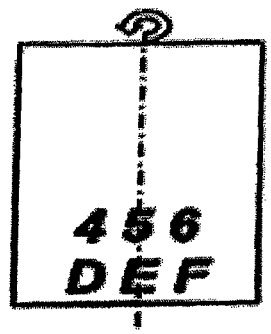

As shown in FIG. 5D, an image acquired by the first CIS 2 is output as a normal image. On the other hand, an image acquired by the second CIS 3 is output as a mirrored image. As shown in FIG. 5E, the mirrored image is inverted by 180 degrees, and turned into a normal image. Thus, the front and the back surfaces of the printed paper 20 can be output as normal images.

Inversion of a mirrored image can be performed by the scanning device. Alternatively, inversion of a mirrored image can be performed by using an external information processing device. Moreover, inversion of an entire mirrored image can be performed by at a time. Alternatively, a mirrored image can be inverted line by line.

It is possible to configure such that the scanning directions of the first CIS 2 and the second CIS 3 are opposite so that the images acquired by both the first CIS 2 and the second CIS 3 are normal images. In other words, when such a configuration is adopted, it is not necessary to invert an image.

Figure 6:
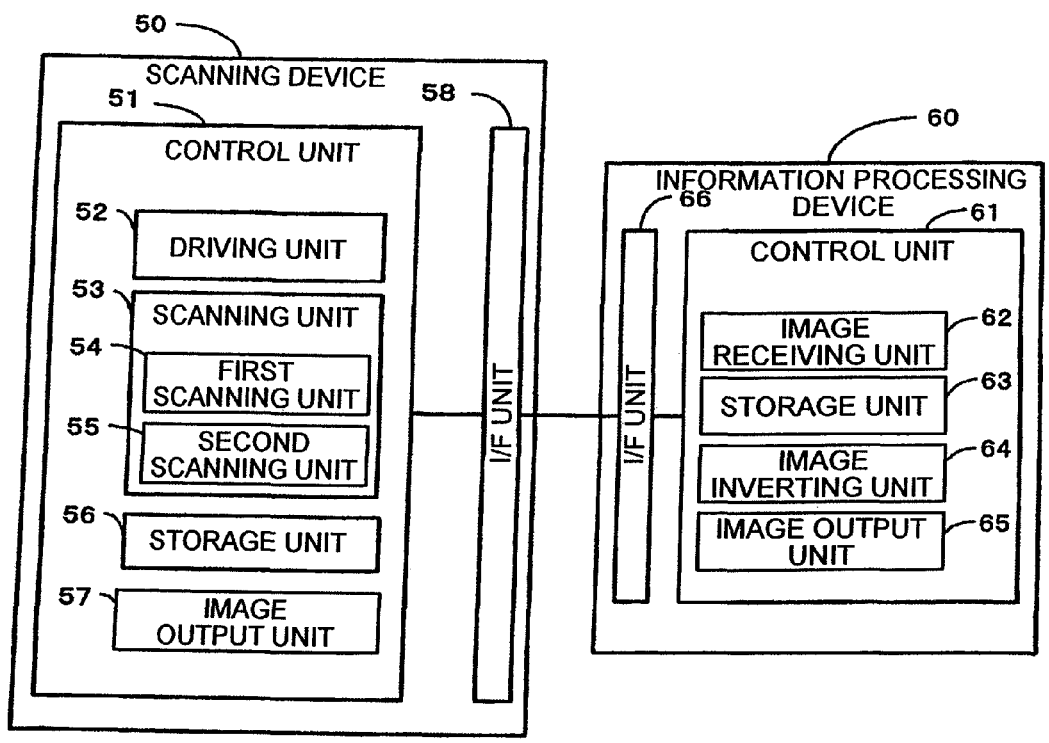
FIG. 6 is a block diagram of an image processing apparatus according to the embodiment.

FIG. 6 is a schematic diagram of an image processing apparatus according to the embodiment. The image processing apparatus includes a scanning device 50 and an information processing device 60. The scanning device 50 scans the front and the back surfaces of the printed paper 20 to obtain images of the printed paper 20. Upon receiving a signal representing a scanned image from the scanning device 50, the information processing device 60 processes the received signal. The scanning device 50 includes a control unit 51 and an interface (I/F) unit 58 for input and output of data.

The control unit 51 stores therein computer programs for implementing various processes performed by the scanning device 50, and causes the scanning device 50 to perform the processes. The control unit 51 includes a driving unit 52, a scanning unit 53, a storage unit 56, and an image output unit 57. The driving unit 52 causes the ADF using a motor (not shown) to pull out a printed paper from a pile of printed papers one at a time and feed the pulled-out paper to the scanning unit 53. Furthermore, when the scanning unit 53 finishes scanning one line of the printed paper, the driving unit 52 causes the ADF to move the printed paper in the sub-scanning direction to an extremely slight degree. When the scanning unit 53 finishes scanning the surfaces of the printed paper, the driving unit 52 causes the ADF to discharge the printed paper from the scanning device 50.

The scanning unit 53 includes a first scanning unit 54 and a second scanning unit 55. The first scanning unit 54 includes the light source 21 and a scanning element array (the rod lens array 13), and the second scanning unit 55 includes the light source 31 and a scanning element array (the rod lens array 13). The light sources 21 and 31 are arranged at the same end of each of the first scanning unit 54 and the second scanning unit 55. The first scanning unit 54 and the second scanning unit 55 concurrently scan the front and the back surfaces of the printed paper. The first scanning unit 54 scans the front surface in the forward direction with respect to the front surface, and the second scanning unit 55 scans the back surface in the backward direction with respect to the back surface. In other words, the scanning directions of the first CIS 2 and the second CIS 3 are the same. The storage unit 56 temporarily stores images scanned by the first scanning unit 54 and the second scanning unit 55. The image output unit 57 sends the images stored in the storage unit 56 to the information processing device 60 through the I/F unit 58.

The information processing device 60 includes a control unit 61 and an I/F unit 66 for input and output of data. The control unit 61 stores therein computer programs for implementing various processes performed by the information processing device 60, and causes the information processing device to perform various processes. The control unit 61 includes an image receiving unit 62, a storage unit 63, an image inverting unit 64, and an image output unit 65. The image receiving unit 62 receives images scanned by the scanning unit 53 from the scanning device 50 via the I/F unit 66, and temporarily stores the received images into the storage unit 63. The images stored in the storage unit 63 include a normal image and a mirrored image of the printed paper.

The image inverting unit 64 inverts a mirrored image of the printed paper stored in the storage unit 63 by 180 degrees, so that the mirrored image is turned into a normal image. After that, the image inverting unit 64 stores the images on the front and the back surfaces of the printed paper in a state of normal images into the storage unit 63. The image output unit 65 outputs that images as normal images to a display device (not shown).

According to an aspect of the present invention, it is possible to reduce the overall size of a scanning device.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A scanning device comprising:
    a first scanning unit having a first line sensor and a first light source that emits a first light beam and is arranged only at one side of the first scanning unit in a main scanning direction, the first scanning unit being arranged to scan a first surface of a scan-target medium along the main scanning direction to acquire a first image; and
    a second scanning unit having a second line sensor and a second light source that emits a second light beam and is arranged only at one side of the second scanning unit in the main scanning direction, the second scanning unit being arranged to scan a second surface of the scan-target medium along the main scanning direction to acquire a second image,
    wherein the first scanning unit and the second scanning unit are disposed such that the first scanning unit and the second scanning unit face to each other,
        the first light source and the second light source are arranged at the same side of the main scanning direction, and
        centers of the first line sensor and the second line sensor are located at the same position in the main scanning direction.

2. The scanning device according to claim 1, wherein centers of the first scanning unit and the second scanning unit are located at the same position in the main scanning direction.

3. The scanning device according to claim 1, wherein the first scanning unit is arranged to scan the first surface in a first scanning direction along the main scanning direction to acquire the first image, the second scanning unit is arranged to scan the second surface in the first scanning direction along the main scanning direction to acquire the second image,
    said scanning device further comprising:
        an information processing unit for inverting one of the first image and the second image by 180 degrees with respect to the main scanning direction.

4. The scanning device according to claim 1, wherein the first scanning unit is arranged to scan a front surface of the scan-target medium as the first surface and the second scanning unit is arranged to scan a back surface of the scan-target medium as the second surface.

5. The scanning device according to claim 1, wherein
    the scan-target medium is folded into two, and
    the first scanning unit is arranged to scan a front surface of the folded scan-target medium as the first surface and the second scanning unit is arranged to scan a back surface of the folded scan-target medium as the second surface.

6. The scanning device according to claim 1, further comprising white reference portions that include:
    a first white reference portion corresponding to the first scanning unit, the first white reference portion being laid on a level on which a scanning surface of the second scanning unit falls; and
    a second white reference portion corresponding to the second scanning unit, the second white reference portion being laid on a level on which a scanning surface of the first scanning unit falls.

7. The scanning device according to claim 1, wherein the first scanning unit and the second scanning unit are arranged to concurrently scan the first surface and the second surface, respectively.

8. An image processing apparatus comprising:
    a scanning device including
        a first scanning unit having a first line sensor and a first light source that emits a first light beam and is arranged only at one side of the first scanning unit in a main scanning direction, the first scanning unit being arranged to scan a first surface of a scan-target medium along the main scanning direction to acquire a first image; and
        a second scanning unit having a second line sensor and a second light source that emits a second light beam and is arranged only at one side of the second scanning unit in the main scanning direction, the second scanning unit being arranged to scan a second surface of the scan-target medium along the main scanning direction to acquire a second image, wherein the first scanning unit and the second scanning unit are disposed such that the first scanning unit and the second scanning unit face to each other, the first light source and the second light source are arranged at the same side of the main scanning direction, and centers of the first line sensor and the second line sensor are located at the same position in the main scanning direction;

a supplying unit for supplying the scan-target medium to the scanning device;

a discharge unit for discharging the scan-target medium from the scanning device; and an information processing device for processing and for outputting the first image and the second image.

9. The image processing apparatus according to claim 8, wherein centers of the first scanning unit and the second scanning unit are located at the same position in the main scanning direction.

10. The image processing apparatus according to claim 8, wherein the first scanning unit is arranged to scan the first surface in a first scanning direction along the main scanning direction to acquire the first image, the second scanning unit is arranged to scan the second surface in the first scanning direction along the main scanning direction to acquire the second image, and the information processing device is configured to invert one of the first image and the second image by 180 degrees with respect to the main scanning direction.

11. The image processing apparatus according to claim 8, wherein the information processing device includes a receiving unit for receiving the first image and the second image from the scanning device;

an image inverting unit for inverting the first image or the second image; and an image output unit for outputting (i) the inverted first image and the second image, or (ii) the first image and the inverted second image.

12. The image processing apparatus according to claim 8, wherein the first scanning unit and the second scanning unit are arranged to concurrently scan the first surface and the second surface, respectively.

13. A scanning device comprising:

a first contact image sensor including a first scanning unit having a first line sensor and a first light source that emits a first light beam and is arranged only at one side of the first scanning unit in a main scanning direction, the first scanning unit being configured to scan a first surface of a scan-target medium along the main scanning direction to acquire a first image;

a second contact image sensor including a second scanning unit having a second line sensor and a second light source that emits a second light beam and is arranged only at one side of the second scanning unit in the main scanning direction, the second scanning unit being configured to scan a second surface of the scan-target medium along the main scanning direction to acquire a second image, and wherein the first scanning unit and the second scanning unit are disposed such that the first scanning unit and the second scanning unit face to each other, the first light source and the second light source are arranged at the same side of the main scanning direction, and centers of the first line sensor and the second line sensor are located at the same position in the main scanning direction; and an information processing unit configured to invert one of the first image and the second image by 180 degrees with respect to the main scanning direction.

14. The scanning device according to claim 13, wherein centers of the first scanning unit and the second scanning unit are located at the same position in the main scanning direction.

* * * * *